US011829365B2

(12) United States Patent
Haile

(10) Patent No.: US 11,829,365 B2
(45) Date of Patent: *Nov. 28, 2023

(54) SYSTEMS AND METHODS FOR DATA QUALITY MONITORING

(71) Applicant: Data Culpa, Inc., Carlisle, MA (US)

(72) Inventor: J. Mitchell Haile, Somerville, MA (US)

(73) Assignee: Data Culpa, Inc., Carlisle, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,169

(22) Filed: May 5, 2022

(65) Prior Publication Data

US 2022/0261403 A1  Aug. 18, 2022

Related U.S. Application Data

(63) Continuation of application No. 16/824,207, filed on Mar. 19, 2020, now Pat. No. 11,429,614.

(60) Provisional application No. 62/978,291, filed on Feb. 18, 2020.

(51) Int. Cl.
  *G06F 16/2455*    (2019.01)
  *G06F 16/25*      (2019.01)

(52) U.S. Cl.
  CPC ...... *G06F 16/24558* (2019.01); *G06F 16/254* (2019.01)

(58) Field of Classification Search
  CPC ...... G06F 16/68; G06F 16/437; G06F 16/116; G06F 16/13; G06F 16/907; G06F 16/254
  USPC ........................................................ 707/602
  See application file for complete search history.

(56) References Cited

U.S. PATENT DOCUMENTS

| | | | |
|---|---|---|---|
| 2011/0082848 A1* | 4/2011 | Goldentouch | G06F 16/9535 707/706 |
| 2014/0067734 A1 | 3/2014 | Hawkins et al. | |
| 2015/0026027 A1 | 1/2015 | Priess et al. | |
| 2016/0147852 A1 | 5/2016 | Effern et al. | |
| 2016/0307173 A1 | 10/2016 | Chauhan et al. | |
| 2019/0028557 A1 | 1/2019 | Modi et al. | |

(Continued)

OTHER PUBLICATIONS

International Search Report and Written Opinion; PCT Application No. PCT/US2021/018511, filed Feb. 18, 2021; dated Jun. 25, 2021; 23 pages.

(Continued)

*Primary Examiner* — Hung T Vy

(57) ABSTRACT

Various embodiments include a data monitoring system that monitors the operations of a data pipeline. The data monitoring system receives a call from the data pipeline to ingest unprocessed data. The data monitoring system generates metadata based on the unprocessed data and responsively computes expected data outputs. The data monitoring system receives a call from the data pipeline to ingest processed data that comprises actual data outputs generated by the data pipeline. The data monitoring system generates output metadata based on the processed data. The data monitoring system compares the metadata for the expected data outputs with the output metadata for the actual data outputs and determines when the expected data outputs do not align with the actual data outputs. When the expected data outputs do not align with the actual data outputs, the data monitoring system generates and transfers an alert signifying the non-alignment.

20 Claims, 13 Drawing Sheets

(56) References Cited

U.S. PATENT DOCUMENTS

2019/0222597 A1\* 7/2019 Crabtree ............. H04L 63/1425
2020/0174966 A1\* 6/2020 Szczepanik ............. G06F 16/13
2021/0090694 A1\* 3/2021 Colley ................... G16B 40/00

OTHER PUBLICATIONS

Tsoch Antaridis et al. Support vector machine learning for interdependent and structured output spaces. Proceedings of the twenty-first international conference on Machine learning. 2004. Jul. 2004 (Jul. 2004) Retrieved on May 22, 2021 (May 22, 2021) from <https://dl.acm.org/doI/abs/10.1145/1015330.1015341> entire document.

\* cited by examiner

SYSTEMS AND METHODS FOR DATA QUALITY MONITORING

CROSS-REFERENCE TO RELATED APPLICATIONS

This U.S. patent application is a continuation of and claims priority to U.S. patent application Ser. No. 16/824,207 entitled, "SYSTEMS AND METHODS FOR DATA QUALITY MONITORING", which was filed on Mar. 19, 2020, which in turn claims priority to U.S. Provisional Patent Application 62/978,291 filed on Feb. 18, 2020, and which are both incorporated by reference into this U.S. patent application in their entirety.

TECHNICAL FIELD

Various embodiments of the present invention generally relate to processing data. More specifically, the embodiments of the present invention relate to systems and methods for data quality monitoring.

BACKGROUND

Working with large data sets brings new challenges for consistency and reproducibility. Standard data query tools can be effective but fall short when working with dynamic data sets. As data processing applications clean, enrich, link, and modify data through processing pipelines, the structure of a data set can change causing standard data query tools to malfunction. Traditional data quality tools typically use human-powered reports. Currently, many solutions for data quality monitoring involve building a team of people to examine the quality of data and then generating a report. However, such approaches that rely on human-labor often take extended periods of time and can be prohibitively expensive. In modern applications, a data quality report that takes an extended period of time to generate is often useless when it becomes available as the problems that result from poor data quality may have arisen before the report is completed.

A variety of technical issues continue to exist when processing data and ingesting data after processing by a data pipeline. Implicit schema and schema creep (typos, changes to schema) often cause issues when ingesting data. Embedded JSON in relational data and document-based NoSQL databases are particularly prone to this type of problem. Completeness issues can also arise when ingesting data. For example, completeness can be compromised when there is an incorrect count of data rows/documents, when there are missing fields or missing values, and/or when there are duplicate and near-duplicate data entries. Additionally, accuracy issues may arise when there are incorrect types in fields (e.g., a string field that often contains numbers but now contains words). Accuracy issues may further arise when there are incorrect category field values (e.g., shirt sizes S, M, L, and purple) or incorrect continuous field values (e.g., usual distribution between 0 and 100, but the distribution is significantly different or out of usual bounds). Data pipelines often have programming bugs which impact data quality and data pipeline code can be extremely difficult to debug. Traditional data monitoring and data cleaning systems are often unable to tackle these issues.

As such, there are a number of challenges and inefficiencies created in traditional data quality monitoring. Unexpected data format changes in the input stream can lead to data distortion during data processing. Unexpected errors tend to propagate through the system, leading to silent failures, data distortions, or missing values. For example, traditional data quality monitoring methods are unable to identify bugs or other technical glitches within a data set in a timely manner. Thus, it can be difficult to quickly respond to problems that occur during the processing of data. It is with respect to these and other problems that embodiments of the present invention have been made.

SUMMARY

Systems and methods are described for data quality monitoring to maintain data integrity during data processing and data storage. In some embodiments, a method to facilitate data monitoring in a computing system is presented. The method calls for ingesting unprocessed data from one or more data input streams and generating metadata using the unprocessed data. The metadata can describe a variety of attributes of the unprocessed data including, but not limited to, data schemas, data types, and data values. The method continues with computing, by utilizing the metadata, one or more expected data outputs from the unprocessed data. The expected data outputs may be predictive of an output from data processing in a data pipeline. Once the expected data outputs have been calculated, processed data emitted from one or more data output streams may be ingested. The processed data can include one or more actual data outputs. In some embodiments, the processed data can be emitted from a data pipeline or other type of data processing system such as an extract/transform/load (ETL) orchestrated environment.

The method continues with determining that the one or more actual data outputs of the processed data do not align with the one or more expected data outputs. In some examples. The non-alignment may result from differences in data schema, differences in data type proportions, differences in the actual data values, or other differences which cause the expected outputs to differ from the actual outputs. After the actual data outputs are determined to not align with the expected data outputs, an alert can be generated that signifies the one or more expected data outputs do not align with the one or more actual data outputs. The alert may then be sent to a client and can include a confidence level indicating at least an accuracy of the generated metadata.

Generating the alert can further comprise generating a visual error report. The visual error report can include graphic elements that highlight which of the one or more actual data outputs do not align with the one or more expected data outputs. The visual error report may be a graph, table, plot, or other type of visualization. Generating the metadata can further include determining a value distribution of the unprocessed data, checking data types of the unprocessed data, and identifying a data schema for the unprocessed data. When generating the metadata, format changes to the unprocessed data can be tracked and the client may be notified of any format changes that occur in the unprocessed data. Changes to object records in the unprocessed data may also be detected in real time and upon detection, the client can be notified about the changes.

In further embodiments, a method to facilitate data monitoring in a computing system is presented. The method includes reading file records of a client. The file records may exist as a permanent file database that stores data received from a data pipeline or other type of data processing service. In some embodiments, changes may occur in the file record of the client when a data pipeline writes new information to the file records. A score may be assigned to any changes that occur in the file records and the score can indicate a severity of a change in the file records. Once the score has been assigned to a change in the file records, the method calls for determining that the score exceeds a score threshold and notifying the client that the score exceeds the score threshold.

The method can further include identifying a location in the file records with a change that exceeds the score threshold and constructing a visual representation that highlights the location in the file record that exceeded the score threshold. Once generated, the visual representation may be sent to the client. In further embodiments, metadata is generated to describe one or more attributes of the file record. Generating metadata can include checking the data types to determine a proportion of strings, numbers, and objects in the file record. Generating metadata can additionally include identifying a schema, a hierarchy, and counts of data items in the file record. Generating metadata can additionally include analyzing one or more actual values in the file record.

Further embodiments include a computerized system to facilitate data monitoring. The computerized system can include a data ingestion engine, a metadata generation platform, and a storage media. The computerized system may be coupled to a data pipeline and/or a database. The data ingestion engine may ingest data and can be communicatively coupled to the metadata generation platform. In some examples, the data ingestion engine can ingest data received from a database or a data processing environment. The metadata generation platform can utilize the ingested data to produce metadata and may be operatively coupled to the data ingestion engine. In some embodiments, the metadata generation platform can include a record hashing module, a schema building module, a type checking module, and a value distribution module. The record hashing module can record changes in data ingested by the data ingestion engine and may assign a score to each observed change. The schema building module can identify a data schema in the data ingested by the data ingestion engine. The type checking module can identify data types in the ingested data while the value distribution module can determine the value distribution in the data ingested by the data ingestion engine. The storage media may be operatively coupled with the metadata generation platform and can store metadata produced by the metadata generation platform. The computerized system can further include a data visualization engine that generates visual representations of metadata generated by the metadata ingestion engine. Additionally, the computerized system can include a data reading engine configured to read file records stored on a client database.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
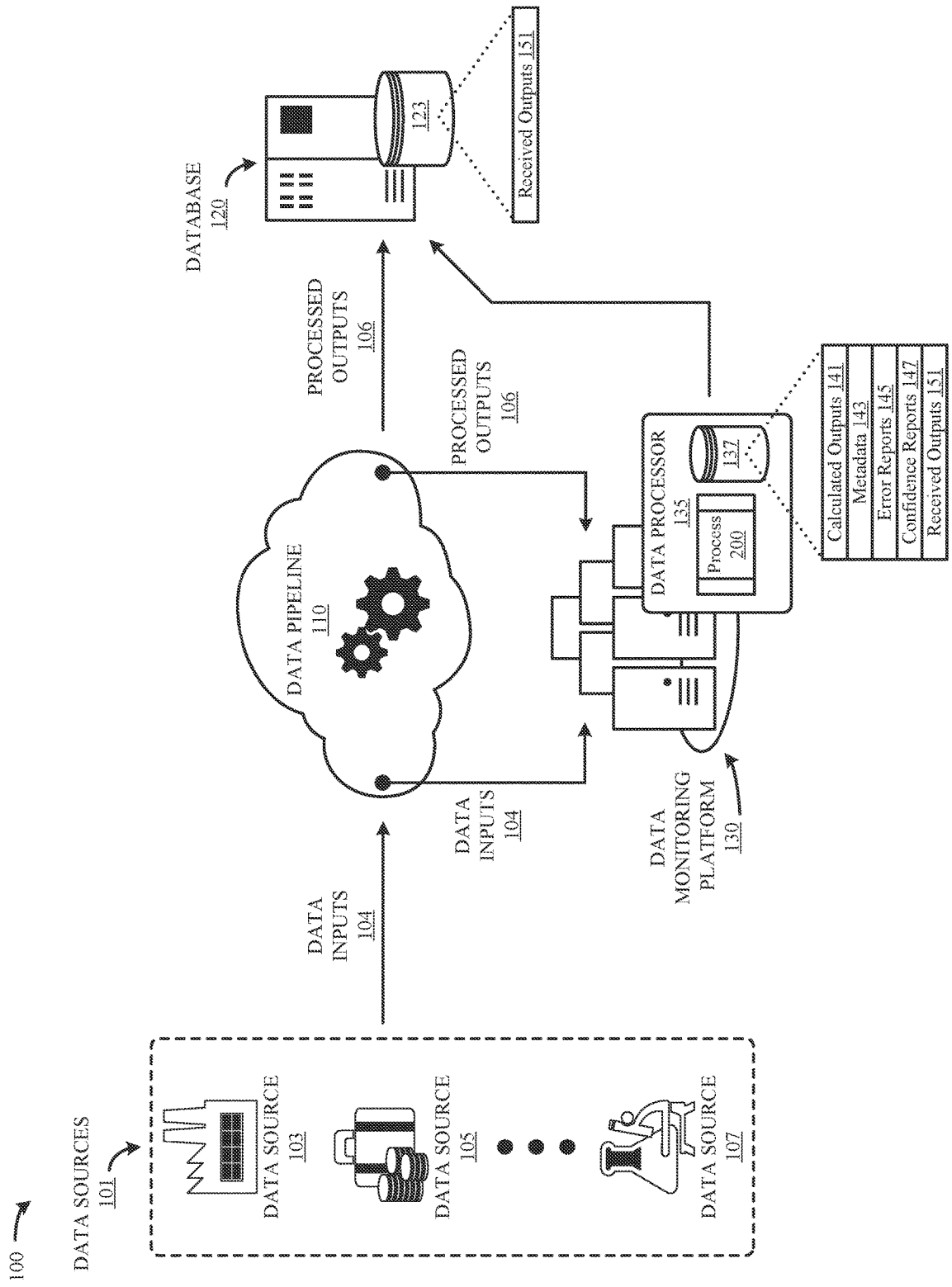
FIG. 1 illustrates an example of an operating environment in which one or more embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology disclosed herein improves the functioning of computing and information processing systems. Various embodiments of the present invention relate generally to data quality monitoring. Many existing data quality tools and "best practices" are one-off activities. For example, such one-off activities may involve first cleaning the data and then analyzing the data which can prevent continuous data monitoring. In contrast, various embodiments of the present technology focus on continuous, high-velocity data feeds that are ingested and re-processed into a database system. Continuous data feeds can include real-time records of mouse clicks, telemetry events, and other real-time activities which prevents the effective use of one-off data analysis techniques. Such systems often require continuous, asynchronous data pipelines and many organizations have built (or bought) their own data cleaning, enrichment, fusion, and linking capabilities to enable these high-velocity operations. Data pipelines are running constantly, and downstream parts of a data intake systems make decisions based on the data in these pipelines. These decision makers are both software and human. The challenge facing downstream data intake systems is not altering operation of the data pipeline but knowing these data pipelines are operating correctly even when the upstream data changes, which is generally outside the control of downstream data intake systems.

In various embodiments, a data monitoring system to maintain data integrity is presented. The data monitoring system can integrate into an existing data pipeline or other type of data processing system. The data monitoring system can monitor the quality of data entering the data pipeline as well as the quality of processed data existing the data pipeline. The data monitoring system may generate metadata to facilitate the data quality monitoring processes. The metadata may be used to determine if the data entering the data pipeline and the processed data exiting the data pipeline are historically consistent and that unexpected changes do not occur. For example, the metadata may be used to determine if the field names of data entering the data pipeline have changed.

In further embodiments, the data monitoring system may integrate into an existing data pipeline or an existing set of data pipelines. Traditionally, data pipelines are only as good as their source data as an error in the data source can cause errors to arise in the data pipeline. To improve the quality and value of a data pipelines, the data monitoring system can verify that the source data is valid. The data pipeline can invoke the data monitoring system to assess the quality of data inputs and to deliver confidence scoring on upstream data compared to previously examined data inputs. The data monitoring system may detect when data formats, schemas, key values, or expected values have changed before the pipeline attempts to load mismatched or incorrect values into a database, data warehouse, or machine learning model.

The data monitoring system can be used in multiple places in pipeline development to identify value and statistical distortion as data flows through the pipeline. The data monitoring system can compare datasets, in multiple geographies, or a previous snapshot, or other related datasets to compute high-level differences and similarity. In further embodiments, the data monitoring system may include a user interface to allow human operators to train the data monitoring system on the currently understood data quality. In some embodiments, the data monitoring system may utilize self-supervised machine learning during training. The results of this machine learning can improve compression and re-calculation organization to improve efficiency. The user interface may include an undo capability to alter decisions made previously if they are found to be incorrect. The data monitoring system may warn that data processing has changed within hours of an error being introduced and provides automated and continuous data review.

The data monitoring system can plug into to any number data pipelines, enabling error catching across asynchronous jobs, mismatches between test and production environments, and other challenging workflows. In various embodiments, the data monitoring system can infer rules, influenced by user feedback, as to pipeline operation frequency, record counter throughput, and data shape.

In further embodiments, the data monitoring system includes metadata APIs that let data pipelines share both data and metadata with the data monitoring system for metrics monitoring. The data monitoring system may automatically generate an alert when anomalies occur or sustain themselves in metadata. For example, the data monitoring system may automatically generate an alert when a drop in the records processed occurs, statistical changes to the data occur, unexpected schema changes occur, inconsistent types of fields arise, and the like. The data monitoring system can track the differences between test and production environments. Data and metrics can be reported to the data monitoring system with a pipeline identifier and an environment name, so that data used in the test environment maintains a realistic correspondence to production data. The data monitoring system may include a validator that integrates into any ETL or data manipulation scripts.

The data monitoring system may employ a variety of statistical tools to model the data shape, expected information, entropy, and other data attributes. Due to the continuous nature of data intake systems, the statistical tools can operate quickly when data rows are changing and may avoid recomputing large calculations. Furthermore, various embodiments can utilize data history information to compare past and present data shape as a means to ascertain the current state of the data. Comparing past and present data sets may utilize data compression techniques to increase the speed of this process. Typical compression works by looking at small buffers of data and entropy-coding the buffers, leveraging related neighbor values. Some embodiments may utilize pre-transforming the data before applying "local compression" techniques to yield significant improvements to compression (e.g., delta compression, column compression).

In some embodiments, a data monitoring system may intake data from either side of a data pipeline. Unprocessed data entering the data pipeline, or copies of the unprocessed data, may be sent to the data monitoring system. The data monitoring system can ingest the unprocessed data and perform predictive analysis to determine the expected outputs that may result from data processing within the data pipeline. The data monitoring system may then compare the expected outputs with the processed outputs of the data pipeline to determine if the data pipeline is operating correctly.

In further embodiments, the data monitoring system may operate as a read only entity without implementing code changes to a data pipeline and/or database. A customer environment can provide a replica node of the data to the data monitoring system that the data monitoring system can connect to, thus reducing load on the primary data nodes. After processing an initial ingest, the data monitoring system can receive change records from the replica and processes them in real time. When processing the change records, the data monitoring system can determine when a change negatively affects a database or data pipeline. The data monitoring system may combine database snapshots, backups, replicas, or multiple databases to compare point-in-time differences among multiple sources, even comparing across live data and .csv or other data formats for records is presented. Long-running asynchronous updates to data combined with automated data cleaning and data enrichment means data is constantly changing. Due to the constantly changing nature of the data, the data monitoring system can audit data changes over time.

In further embodiments, the data monitoring system may populate test databases or provide virtual presentation layers with a statistically meaningful subset of data for machine learning training and quality assurance testing. Some embodiments provide for a data monitoring system that prepares and audits data for machine learning models automatically across different data sources and models. The data monitoring system may identify differences between two data sets so that the two data sets can be made consistent with one another. The data monitoring system may further provide a unit test suite of tools and rules for datasets, enabling users to provide semantic rules to the data monitoring system to refine warnings, inferring inter- and intra-relationships, and so on. Via both sampling and comprehensive analytics, the data monitoring system can provide quality scoring that enables analysts to annotate or document confidence in their reports and visualizations of the data presented to the end-user. The data monitoring system may additionally provide interactive data visualization to the user. The interactive data visualizations can summarize data sets and present data sets graphically and interactively.

The data monitoring system can plug into a database directly as a read-only user. A user may direct the data monitoring system at a read-only replica of a database to reduce performance impact on production or configure the data monitoring system to read from database snapshots. The data monitoring system may detect changes to object records over time, as they happen. For example, when a new field is added to a record, field name is misspelled, or inconsistent type are used in a field, the data monitoring system can detect these errors and generate an alert without having to wait for downstream consequences to reveal themselves. This may allow for faster diagnosing of database and/or data pipeline problems closer to the source and closer to real-time. The data monitoring system may flag database conditions that "should never happen" and can generate an automatic warning when they happen again.

Various embodiments of the present technology provide for a wide range of technical effects, advantages, and/or improvements to computing systems and components. For example, various embodiments include one or more of the following technical effects, advantages, and/or improvements: 1) comparing point-in-time differences between multiple large data sets; 2) auditing changes to data sets over time; 3) detection of software bugs or changes in object records over time; 4) providing interactive data visualization to present large data sets in a condensed manner; 5) preparing large data sets for machine learning engines; 6) integrating into existing database environments to monitor data quality without altering database structure; and/or 7) generating metadata in real time to predict changes in data from data processing. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to data quality monitoring by detecting changes to datasets (e.g., changes in filed names, changes in proportions of data types etc.) in a database and/or a data pipeline, embodiments of the present technology are equally applicable to various other data processing techniques and systems.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

FIG. 1 includes operating environment 100 which illustrates various embodiments of the present technology. Operating environment 100 includes data sources 101, data pipeline 110, database 120 and data monitoring platform 130. Data sources 101 further includes data source 103, data source 105, and data source 107. However, it should be appreciated that data sources 101 is not limited by the type, or number of data sources. For example, data sources 101 may produce customer information data, industrial production data, online activity data, and/or other types of data. In some embodiments, data sources 101 can generate data inputs 104. Data pipeline 110 is representative of one or more data processing elements. In some embodiments, data pipeline 110 may include an extract/transform/load (ETL) orchestrated environment. Data pipeline 110 can receive data inputs 104 from data sources 101. In some embodiments, the data inputs 104 may include information generated by one or more of data sources 103, 105, or 107.

Data pipeline 110 may perform a variety of processes on data inputs 104 received by data sources 101 to generate processed outputs 106. For example, data pipeline 110 may extract relevant data components from data inputs 104 and transform the relevant components into processed outputs 106 that are readable by database 120, and then load, or otherwise send processed outputs 106 to database 120. Data pipeline 110 may exist as a single data processing entity or as multiple data processing entities linked in series. In some embodiments, data pipeline 110 may have one or more inherent programming errors which cause elements of processed outputs 106 to be malformed. For example, an inherent programming error in data pipeline 110 may replace a string with an object during the processing of data inputs 104, causing an unexpected change in processed outputs 106. Alternatively, data inputs 104 may exist in a non-standard state upon entering data pipeline 110 causing data pipeline 110 to incorrectly process data inputs 104.

Database 120 is representative of one or more computing devices integrated into a network that communicates with data pipeline 110 and database 120. Examples of applicable computing devices include, but are not limited to, server computers and data storage devices deployed on-premises, in the cloud, in a hybrid cloud, or elsewhere, by content providers such as enterprises, organizations, individuals, and the like. Database 120 may rely on the physical connections provided by one or more other network providers such as transit network providers, Internet backbone providers, and the like to interface with data pipeline 110 and data monitoring platform 130. Database 120 includes storage system 123. Storage system 123 may be any number of storage devices including random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In some embodiments, database 120 receives processed outputs 106 from data pipeline 110 and stores processed outputs 106 on storage system 123 as received outputs 151.

Data monitoring platform 130 is representative of one or more computing devices, such as server computers and data storage devices deployed on-premises, in the cloud, in a hybrid cloud, or elsewhere, and the like. Data monitoring platform 130 can be operatively coupled to data pipeline 110 and communicatively coupled to database 120. Data monitoring platform 130 can include data processor 135 and local storage 137. In some embodiments, data monitoring platform 130 can receive a call from data pipeline 110 to ingest data inputs 104, before data pipeline 110 processes data inputs 104. Data monitoring platform 130 can further receive calls from data pipeline 110 to ingest processed outputs 106. Upon ingesting data inputs 104 and processed outputs 106, data monitoring platform 130 can relay data inputs 104 and processed outputs 106 to data processor 135. Data processor 135 may then store processed outputs 106 on local storage 137 as received outputs 151.

Data processor 135, after receiving data inputs 104, can utilize data inputs 104 to implement process 200, or other similar processes, to generate calculated outputs 141, metadata 143, error reports 145, and confidence reports 147. In some embodiments, calculated outputs 141 are representative of an expected output of data pipeline 110 when processing data inputs 104. For example, data processor 135 may mimic the operation of data pipeline 110 to calculate the expected result of when data pipeline 110 ingests and processes data inputs 104. Once calculated outputs 141 are generated, data processor 135 may cross-examine data outputs 141 with received outputs 151. In doing so, data processor 135 may determine if calculated outputs 141 accurately align with received outputs 151.

Data processor 135 can use data inputs 104 to generate metadata 143. Metadata 143 may describe various components of data inputs 104. For example, metadata 143 may include information describing a schema, a hierarchy, counts, data types, and a distribution of data types in data inputs 104. Data processor 135 may in some instances use metadata 143 to determine if received outputs 151 properly align with calculated outputs 141. In further embodiments, data processor 135 can use metadata 143 to determine if data inputs 104 are correctly formatted. For example, data processor 135 can identify that metadata 143 is different than an expected data structure of data inputs 104, and in turn, determine that data inputs 104 possess one or more incorrect data elements. If data processor 135 determines that data inputs 104 include one or more incorrect data elements, data platform 130 may then notify data pipeline 110 to abort the processing of data inputs 104. In some examples, data processor 135 may use previously generated metadata to determine if metadata 143 generated using data inputs 104 is historically consistent. Data processor 135 may operate in real time and may be a fully automated computing system.

In some embodiments, in the event that calculated outputs 141 do not align with received outputs 151 and/or data inputs 104 are found to be malformed, data processor 135 can generate error reports 145 and confidence reports 147. Error reports 145 can include one or more visual elements highlighting what elements of received outputs 151 do not align with calculated outputs 141. Error reports 145 can additionally highlight components of calculated outputs 141 that do not align with received outputs 151. In some embodiments, the visual elements may include one or more charts, graphs, tables, animations, gifs, or other visuals to pinpoint the non-aligned components of received outputs 151. For example, a visual element of error reports 145 may indicate that a data string in received outputs 151 has replaced with a data object. Error reports 145, once generated, can then be sent to database 120 to notify database 120, or an entity in control of database 120, that one or more components in received outputs 151 do not align with calculated outputs 141. Error reports 145 may further include an abort command directing database 120 to cease ingesting processed outputs 106 from data pipeline 110.

In some embodiments, confidence reports 147 may include a confidence level indicating how likely received outputs 151 do not align with calculated outputs 141. Alternatively, confidence reports 147 may include a confidence level indicating how likely data inputs 104 include one or more malformed elements. Once generated, confidence reports 147 may be sent to database 120.

Figure 2:
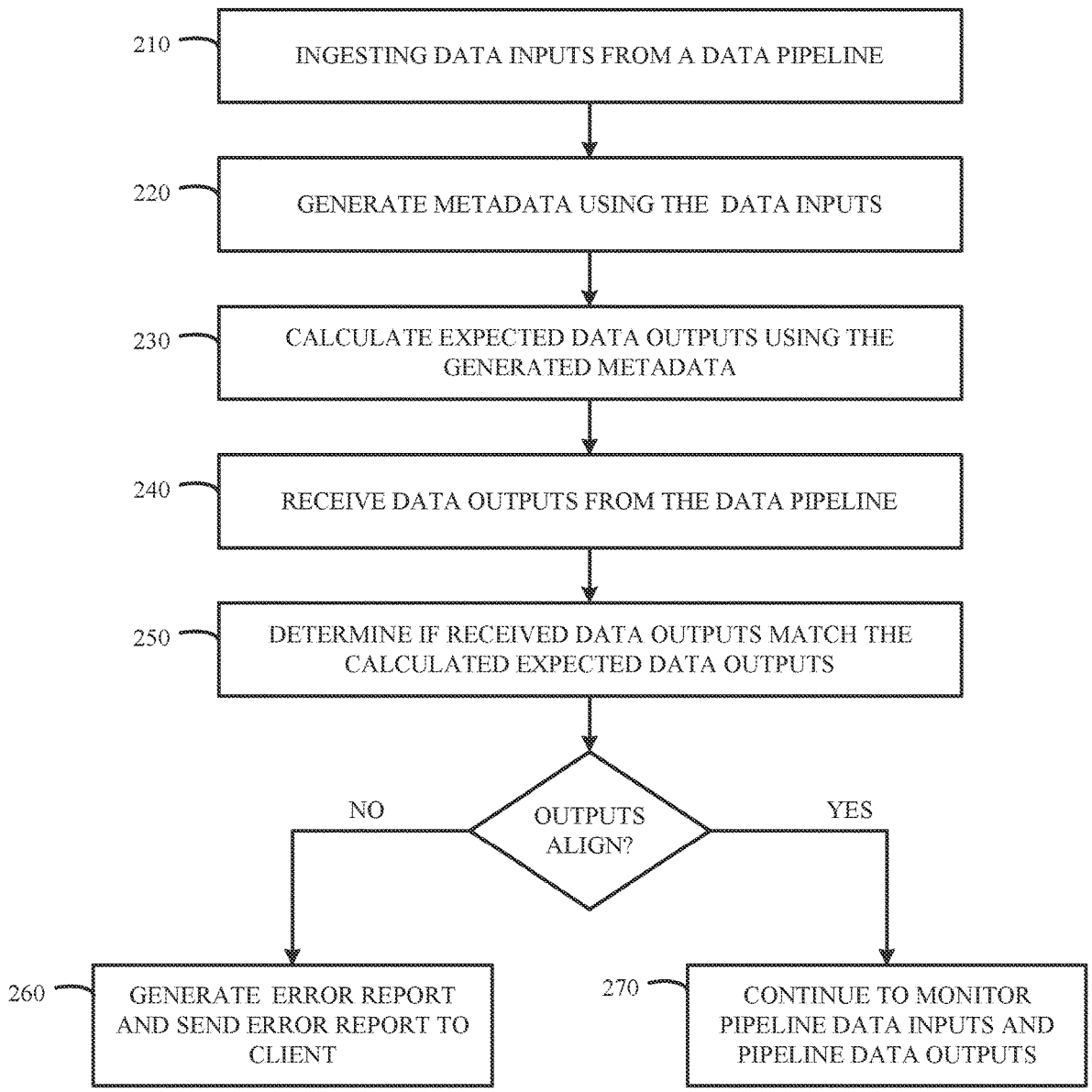
FIG. 2 is a flowchart illustrating a set of operations for operating a data quality monitoring platform according to one or more embodiments of the present technology.

In some embodiments, data processor 135 performs data monitoring process 200, described in FIG. 2, in order to determine if received outputs 151 properly correlate with calculated outputs 141. Data monitoring process 200 may be implemented in program instructions in the context of any of the software applications, modules, components, or other such programming elements of data monitoring platform 130 and/or data processor 135. The program instructions direct the underlying physical or virtual computing system or systems to operate as follows, referring parenthetically to the steps in FIG. 2 and in the context of the operating environment 100 of FIG. 1.

FIG. 2 is a flowchart illustrating a data monitoring process according to one or more embodiments of the present technology. The data monitoring process 200 may be fully automated and can require no user input. Alternatively, data monitoring process 200 may allow user input to provide for user customization of the data monitoring process. A server or other type of computing device (e.g., data processor 135) employing data monitoring process 200 receives a call from a data pipeline (e.g., data pipeline 110) to ingest data inputs (step 210). The data pipeline may be an ETL orchestrated environment or other type of data processing environment that can ingest and process the data inputs (e.g., data inputs 104). Once the data inputs have been ingested, the server generates metadata (e.g., metadata 143) using the data inputs (Step 220). In some embodiments, the metadata can include the field names, type of hierarchy, number of data items, proportions of data types, and actual values within the data inputs. Once generated, the server can store the metadata in one or more storage systems (e.g., local storage 137). In some examples, the storage system may include a metadata record that includes previously generated metadata. The server may compare the generated metadata to the previously generated metadata to ascertain if the newly ingested data inputs are historically consistent with previous data inputs. When historical consistency is not observed, the server can determine that at least one element of the ingested data inputs is different than previously ingested data inputs. For example, the server may determine that the schema of the ingested data inputs is different than the schema of the previously ingested data inputs. In some embodiments, if historical inconsistency is observed, the server may notify the data pipeline and instruct the data pipeline to cease processing the data inputs.

Once stored, the server may calculate expected data outputs using the generated metadata (step 230). In some embodiments, the calculated outputs may include expected outputs from the data pipeline when the data pipeline processes the data inputs. For example, the calculated outputs may include an expected schema, expected data types, and expected data values that result from processing the data inputs in the data pipeline. Either before or after the server has calculated the expected data outputs, the server can receive data outputs (e.g., processed outputs 106) from the data pipeline (step 240). In some embodiments, the data outputs may be generated by the data pipeline by processing the data inputs. Once the data outputs have been received by the server, the server can determine if the received data outputs match the expected data outputs calculated by using the ingested data inputs (step 250). In some embodiments, the server may generate metadata using the received data outputs and then compare the output metadata with the input metadata. In further embodiments, the server may compare the expected schema, the expected data types, and the expected data values of the expected outputs with the actual schema, the actual data types, and the actual data values of the received outputs.

If the sever determines that the expected outputs and the received outputs do not align or are otherwise different, the server may generate an error report and send the error report (e.g., error reports 145) to a client (step 260). In some embodiments, the client (e.g., database 120) may be the destination of the processed data emitted from a data pipeline. The error report may include one or more visualizations that point out which elements of the received data outputs do not align with calculated expected data. In some examples, the visualizations may be a chart, a plot, a table, or an animation and can summarize the contents of a database. However, it should be appreciated that the type of visualization is not limited. In further embodiments, the error reports may include a confidence level (e.g., confidence reports 147) that indicates how likely the received data outputs are to not align with the calculated expected outputs. For example, the confidence level may indicate an 80% confidence that the received data outputs do not align with the expected data outputs. The confidence level may further indicate an accuracy of the generated metadata. The error report may further include an abort command to direct the client to stop receiving data from the data pipeline. However, if the expected data outputs align with the received data outputs, the server can continue to monitor pipeline data inputs and outputs (step 270).

Figure 3:
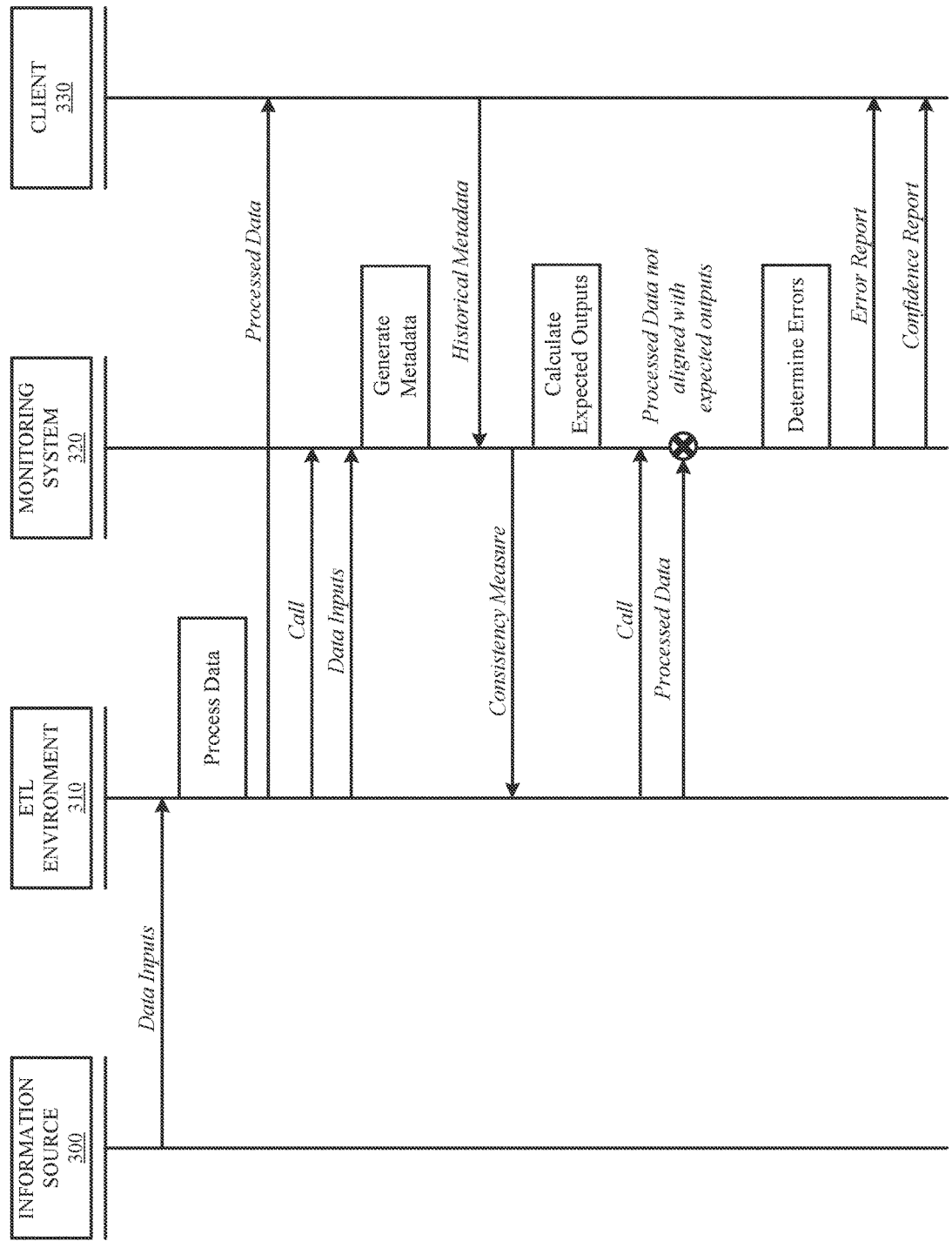
FIG. 3 is a sequence diagram for data quality monitoring according to one or more embodiments of the present technology.

FIG. 3 illustrates a sequence diagram representing an operational sequence according to one or more embodiments of the present technology. In some embodiments, the operational sequence may include some or all aspects of data monitoring process 200. FIG. 3 includes information source 300, ETL environment 310, monitoring system 320, and client 330. Information source 300 can send data inputs to ETL environment 310. Information source 300 is representative of a variety of processes which produce data. Examples include, but are not limited to, customer purchasing data, advertisement data, company revenue data, industrial production data, online website activity data, and the like. The data inputs can be sent to ETL environment 310 in an unprocessed state. ETL environment 310 is representative of a data processing system to intake unprocessed data and transform the unprocessed data into a storable state. Upon receiving the data inputs, ETL environment 310 processes the data and then sends the processed data to client 330. Processing can include an extract/transform/load process or similar data formatting process. Client 330, after receiving the processed data may store the processed data. The storage can be permanent or temporary and may be performed in real time or in batches.

ETL environment 310 can additionally call monitoring system 320 with a request for monitoring system 320 to ingest the data inputs. Monitoring system 320, after accepting the call, receives the data inputs from ETL environment 310. In some embodiments, monitoring system 320 can include a validator to receive the call from ETL environment 310. Monitoring system 320 can utilize the data inputs to generate metadata that describes one or more characteristics of the data inputs. The metadata may describe the schema, the types, and the values or the data inputs. Monitoring system 320 can then receive historical metadata from client 330. In some embodiments, the historical metadata may include the correct and/or the preferred structure of data inputs sent to ETL environment 310. The historical metadata may further include information on the structure of previous data inputs sent to ETL environment 310. In alternative embodiments, the historical metadata may be locally stored in monitoring system 320 instead of being received from client 330. Monitoring system 320 can then compare the generated metadata with the historical metadata to determine if the data inputs are structurally consistent with previous data inputs received by ETL environment 310. Monitoring system 320 may then send a constancy measure to ETL environment 310. The consistency measure can indicate how similar the generated metadata is to the historical metadata. If the generated metadata is inconsistent with the historical metadata, ETL environment 310 may cease intaking data inputs from information source 300. In some examples, ETL environment 310 may reformat the data inputs to become consistent with previous data inputs. ETL environment 310 can include a processing engine to determine, by utilizing the consistency measure, whether or not to proceed with processing data inputs received from information source 300.

In further embodiments, monitoring system 320 can calculate one or more expected outputs. The expected outputs may be a predictive model for the processed outputs produced by ETL environment 310. The expected outputs may model the data shape, expected information, entropy, and other data attributes of the processed outputs. In some examples, monitoring system 320 can utilize the generated metadata to calculate the expected outputs.

After processing the consistency measure, ETL environment 310 may call monitoring system 320 with a request to ingest the processed data. Monitoring system 320 can then ingest the processed data. After ingesting the processed data, monitoring system 320 can then determine that the processed data generated by ETL environment 310 does not align with the expected outputs calculated by monitoring system 320. Monitoring system 320 can then identify the errors that cause the processed outputs to not align with the expected outputs.

In some examples, the monitoring system 320 may identify differences in data structure, data types, proportions of data types, and/or actual data values between the processed outputs and the calculated expected outputs. Monitoring system 320 may then send an error report to client 330 outlining the differences between the processed data and the calculated expected outputs. In some examples, the error report may include one or more visual elements specifically pointing out which fields of the processed outputs do not align with the expected outputs. Monitoring system 320 may further send a confidence report to client 330 that includes a confidence level. The confidence level may indicate how likely the calculated expected outputs are to be different than the processed outputs. For example, a confidence level of 85% may indicate that there is an 85% likelihood that the calculated expected outputs do not align with the processed outputs of ETL environment 310.

Figure 4:
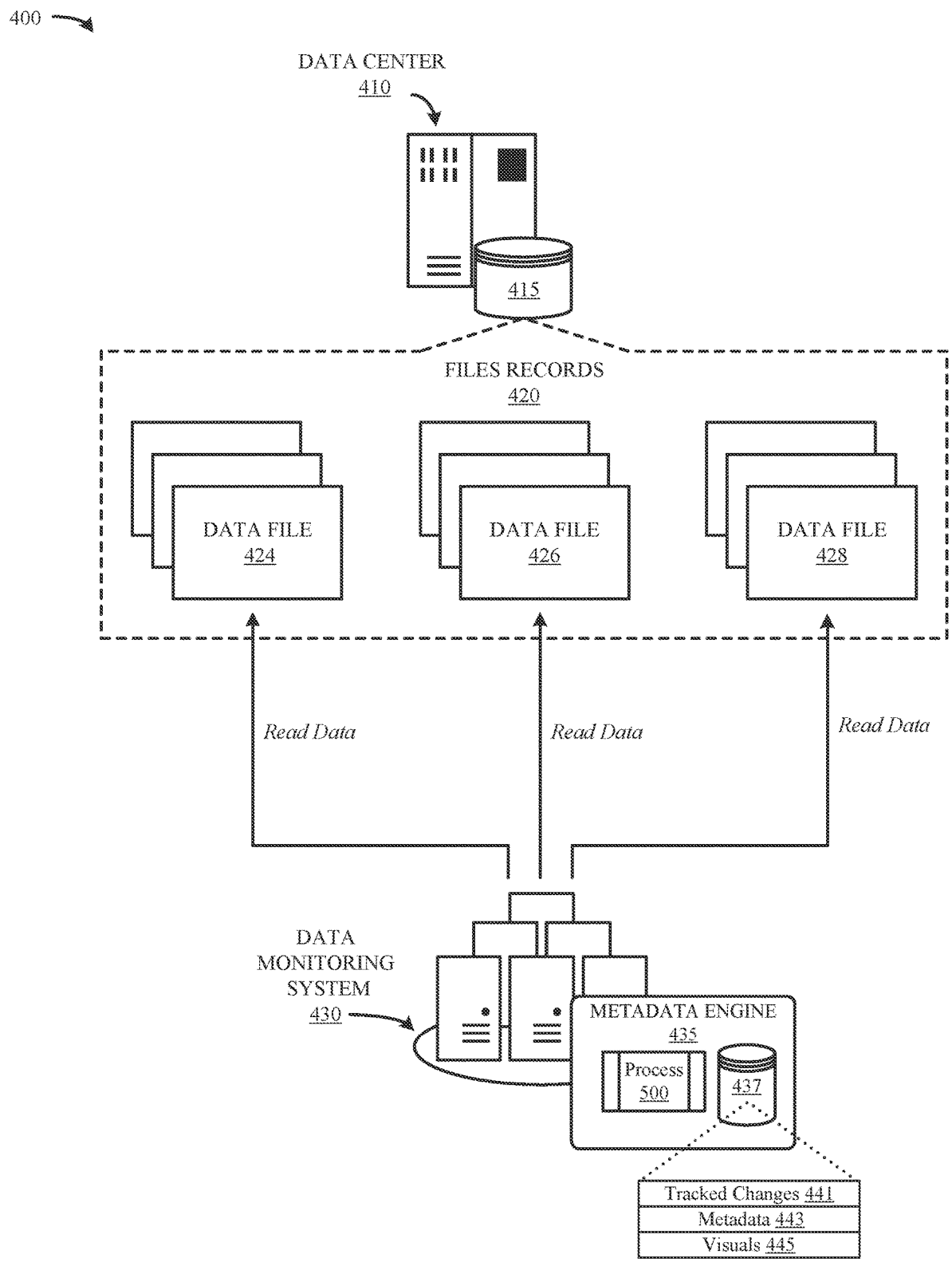
FIG. 4 illustrates an example of an operational architecture according to one or more embodiments of the present technology.

FIG. 4 includes operational architecture 400 which illustrates one or more embodiments of the present technology. Operational architecture 400 includes data center 410, file records 420, data monitoring system 430, and metadata engine 435. Data center 410 is representative of one or more computing devices such as a server computer and includes file system 415. File system 415 is representative of one or more storage devices and can be configured to store file records 420. Examples or storage devices include, but are not limited to, hard disk storage drives and/or solid-state storage drives. In some embodiments, data center 410 may be communicatively coupled to a data pipeline or another type of data processing system. Data center 410 may receive data generated by the data pipeline and then write the received data to file system 415.

File records 420 includes data file 424, data file 426, and data file 428. Data files 424, 426, and 428 are representative of data stored on file system 415. File records 420 can be a replica dataset. In should be appreciated that the number and type of data files stored on file system 415 is not limited. In some embodiments, data files 424, 426, and 428 may include data received from a data pipeline or data replicas of data received from a data pipeline. When new data is received by data center 410 and written to file records 420, changes may occur in any of data files 424, 436, and 428. In some examples, file records 420 can include a record of changes that occur in any of data files 424, 426, or 428. Data files 424, 426, and 428 may be permanent file records of data received from a data pipeline or a replica of the permanent file records.

File system 415 can be communicatively coupled to data monitoring system 430. Data monitoring system 430 is representative of one or more computing devices and includes metadata engine 435 and storage system 437. Metadata engine 435 is representative of one or more computing devices that can implant program instructions to record any changes that occur in the data files of file records 420. In some embodiments, metadata engine 435 may create a local copy of changes to data files 424, 426, and 428 and then store the local copy on storage system 437 as tracked changes 441. In further embodiments, metadata engine 435 can read data files 424, 426, and 428 of file records 420 to determine the contents of data files 424, 426, and 428. Metadata engine 435 may further utilize the read data to generate metadata describing data files 424, 426 and 428 and store the generated metadata on storage system 437 as metadata 443. Metadata engine 435 may use metadata 445 to create visuals 445. Visuals 445 may visually present metadata 445 and provide a summary of any or all components of file records 420. In some embodiments, metadata engine 435 may run data monitoring process 500. Data monitoring process 500 may be implemented as program instructions in the context of any software applications, modules, components, or other such programming elements of data monitoring system 430 and/or metadata engine 435. The program instructions can direct the underlying physical or virtual computing system or systems to operate as follows, referring parenthetically to the steps in FIG. 5 and in the context of the operational architecture 400 of FIG. 4.

Figure 5:
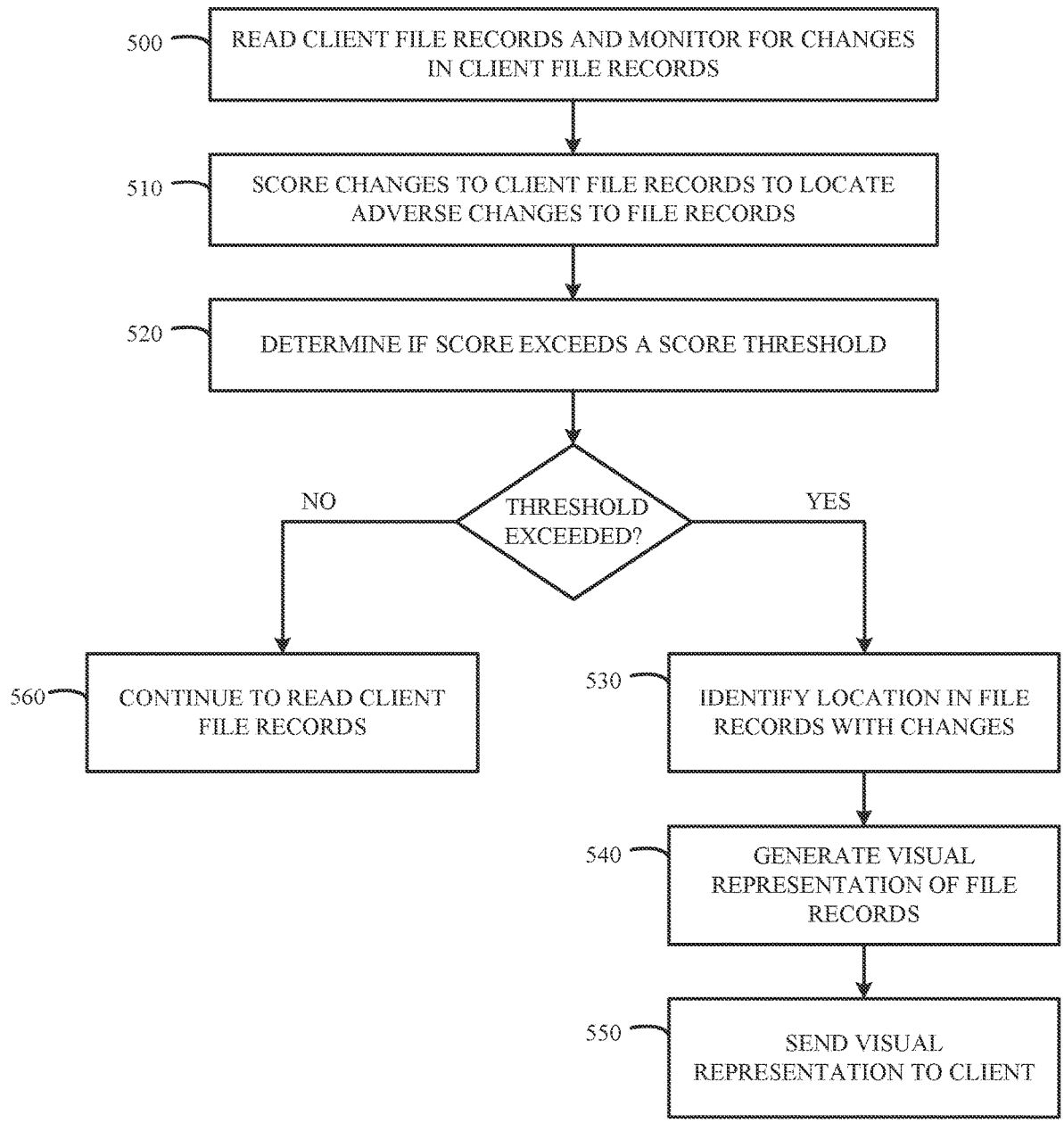
FIG. 5 is a flowchart illustrating a set of operations for operating a data quality monitoring platform in accordance with some embodiments of the present technology.

FIG. 5 is a flowchart illustrating a data monitoring process according to one or more embodiments of the present technology. The data monitoring process may be implemented as program instructions and can be fully automated. A server or other type of computing device (e.g., metadata engine 135) may read file records of a client (e.g., file records 420) and monitor for changes in the file records of the client (step 500). In some examples, the server may act as a read-only entity and track the changes in the client's file records. The server may further create a copy of the tracked changes (e.g., tracked changes 441) and store the copy on a local database (e.g., storage system 437). In some embodiments, the changes to the file records may be caused by a data pipeline or other type of data processing service writing new data to the file records.

As the server is tracking the changes to the file record, the server may score the changes to the client file records to locate adverse changes to the file records (step 510). The score assigned by the server can reflect the severity of an adverse change. For example, a large score may indicate an adverse change to the file record while a small score may indicate a non-detrimental change to the file record. In some embodiments, the score may be an alphanumeric score. In further embodiments, the server may generate metadata (e.g., metadata 443) that describes the file records and/or changes that occurred in the file records to aid in scoring the tracked changes. The server may compare the generated metadata to previously generated metadata to determine if the generated metadata is historically consistent. Generated metadata that is historically inconsistent can indicate that an adverse change has occurred in the file records. Examples of adverse changes can include, but are not limited to, unexpected changes to the file record that alter the existing data schema, data hierarchy, data types, proportions of data types, or actual data values of the file record. For example, an adverse change may result if the field names in a file record are unexpectedly changed.

The server, after scoring an observed change, can then determine if the score exceeds a score threshold (step 520). The score threshold may be a limit that indicates the severity of a scored change. For example, if the score exceeds the score threshold, the server may deem the change an adverse change and identify the location in the file record with the adverse change (step 530). Once the location of the adverse change is identified, the sever can then generate a visual representation of the file records (step 540). The visual representation may include one or more visual or textual elements which point out the location in the file records with the adverse change as well as the severity of the adverse change. In some embodiments, the visual representation can include one or more charts, plots, graphs, tables, pictures, or animations to highlight the location and the severity of the scored changes. Once generated, the server may send the visual representation to the client (step 550). Likewise, if the server determines that the score is below the score threshold, the server may deem the score non-detrimental or otherwise not adverse and continue can continue to read the client file records (step 560).

Figure 6:
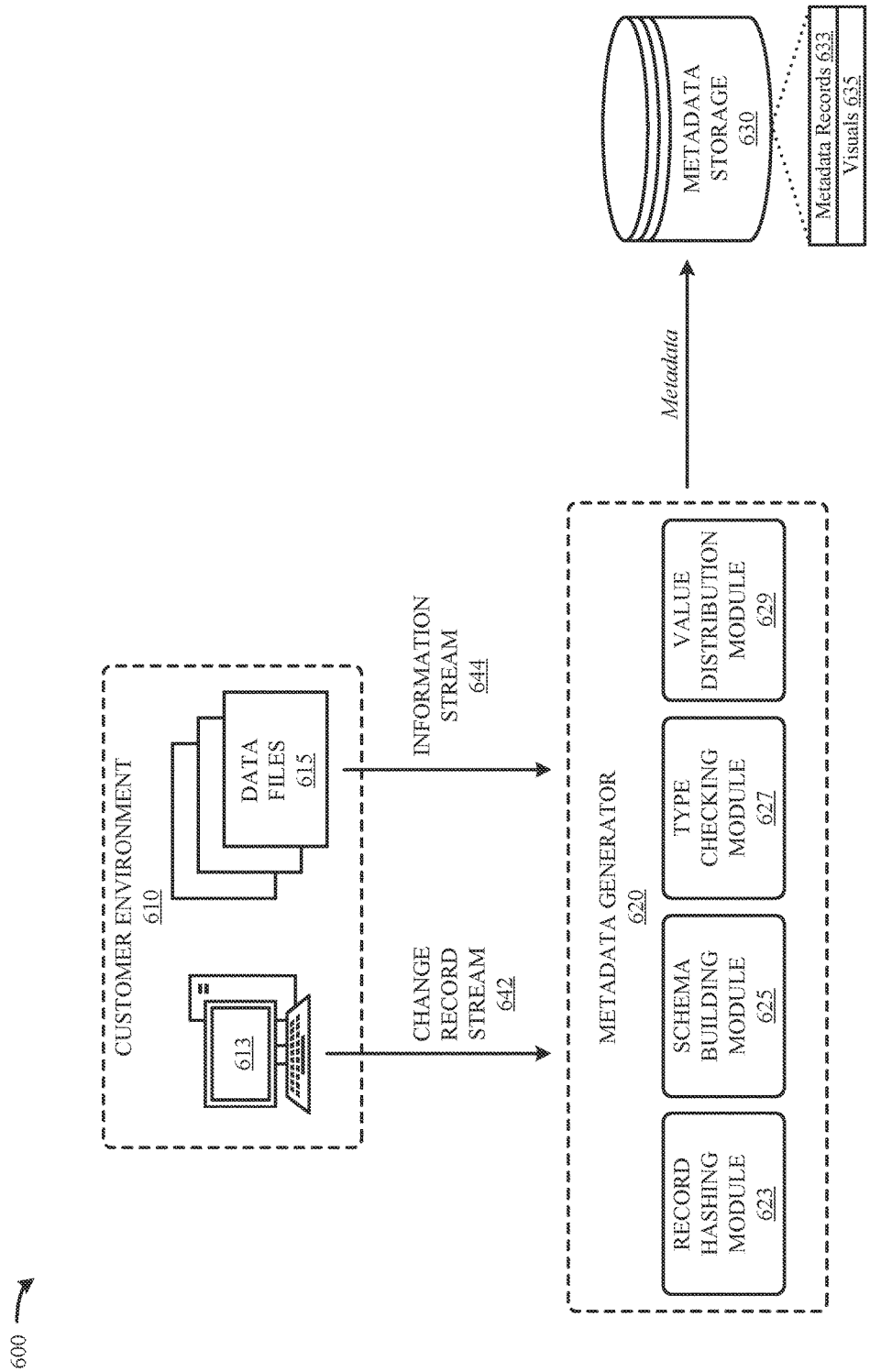
FIG. 6 illustrates metadata generation platform in accordance with one or more embodiments of the present technology.
Figure 7A:
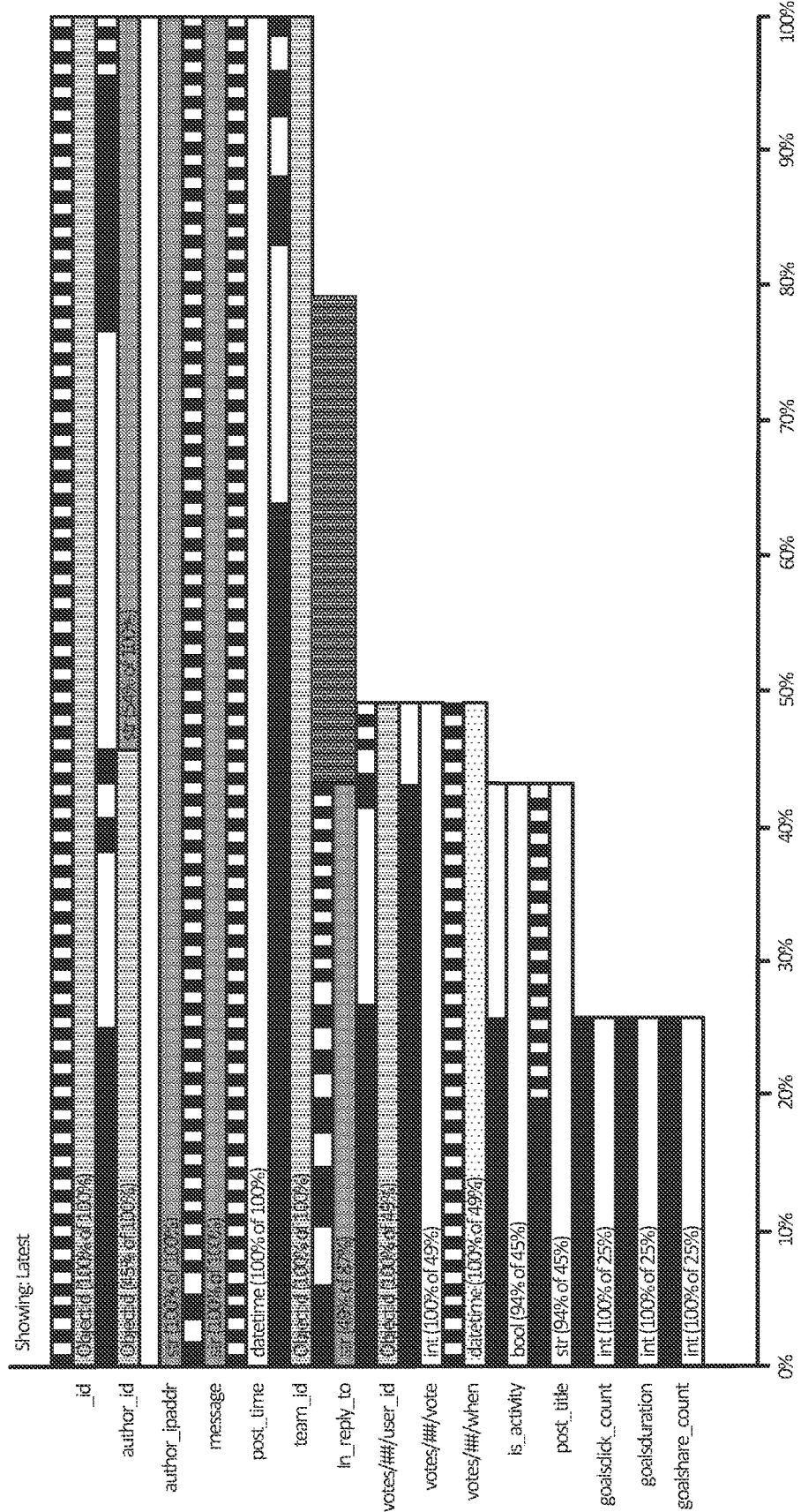
FIGS. 7A-7F illustrate data visualizations in accordance with some embodiments of the present technology.
Figure 7B:
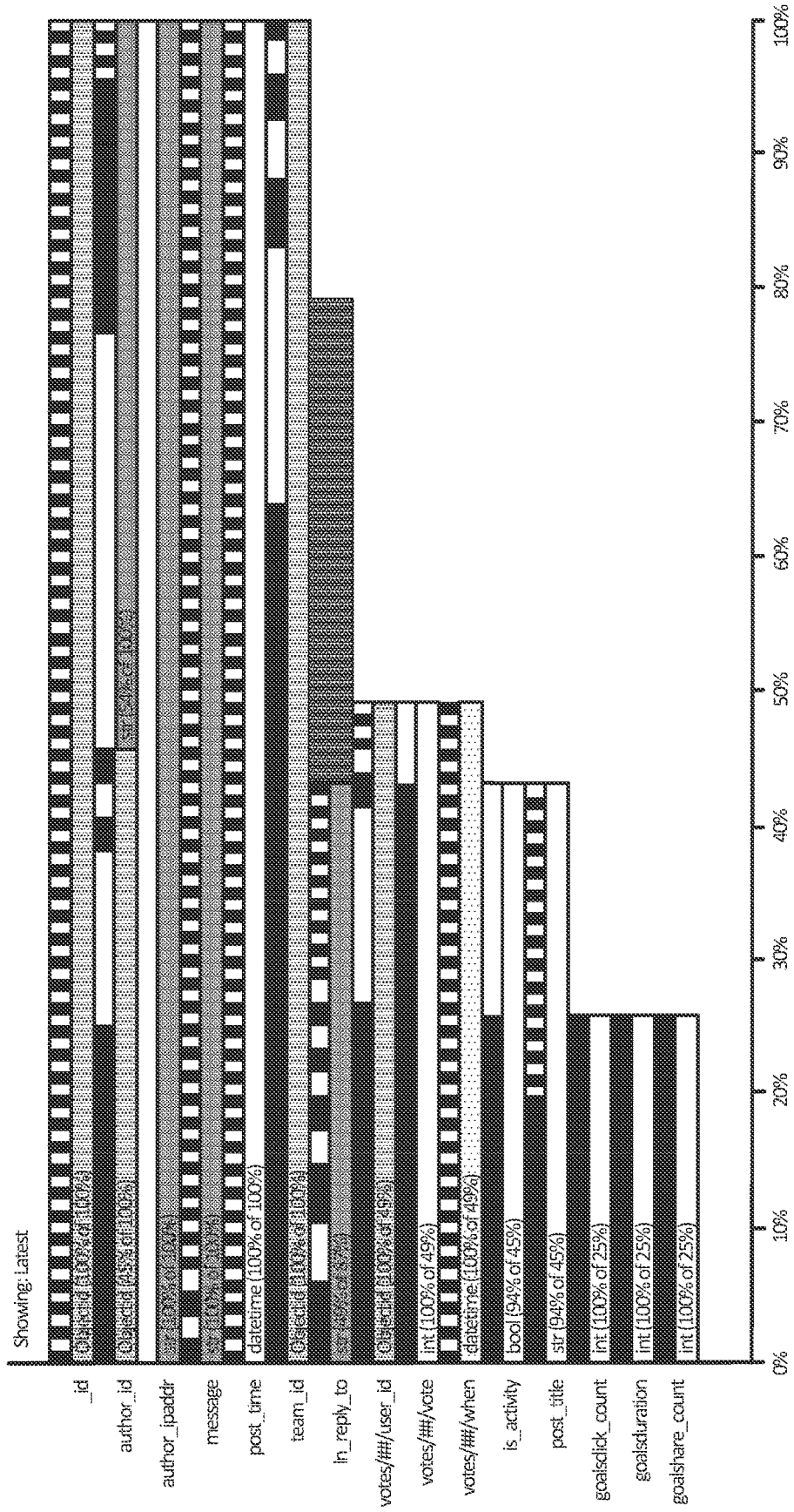
Figure 7C:
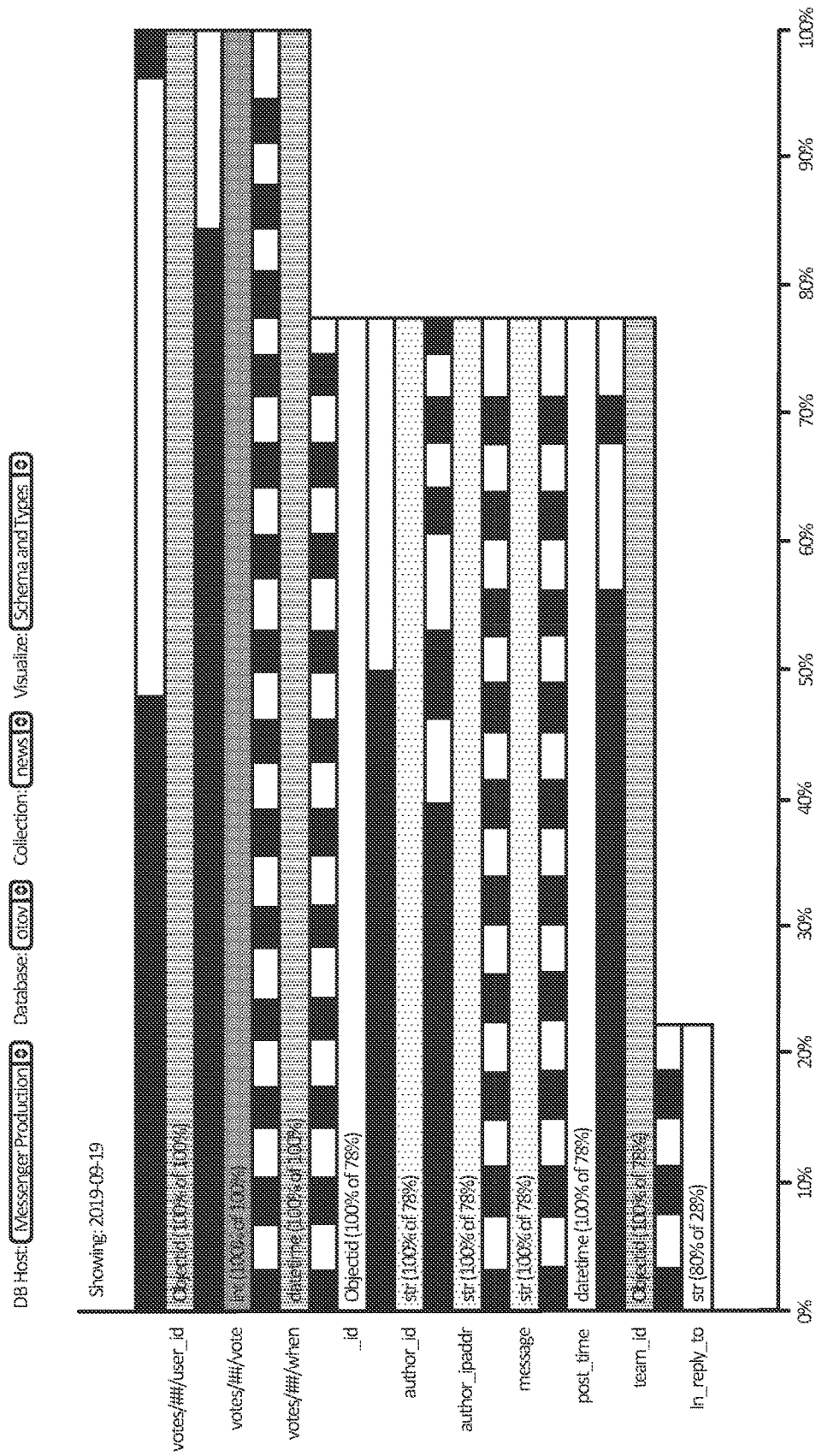
Figure 7D:
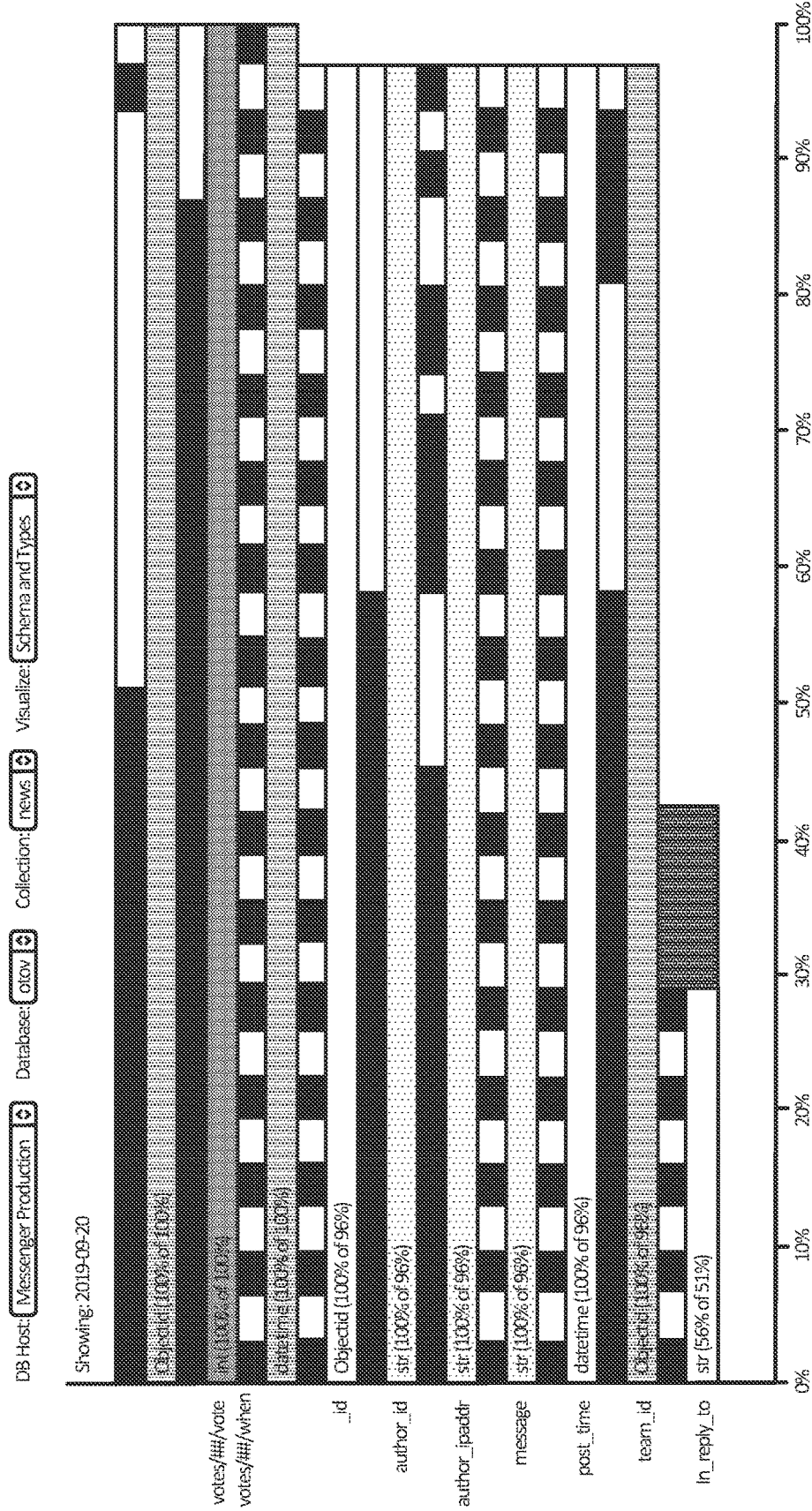
Figure 7E:
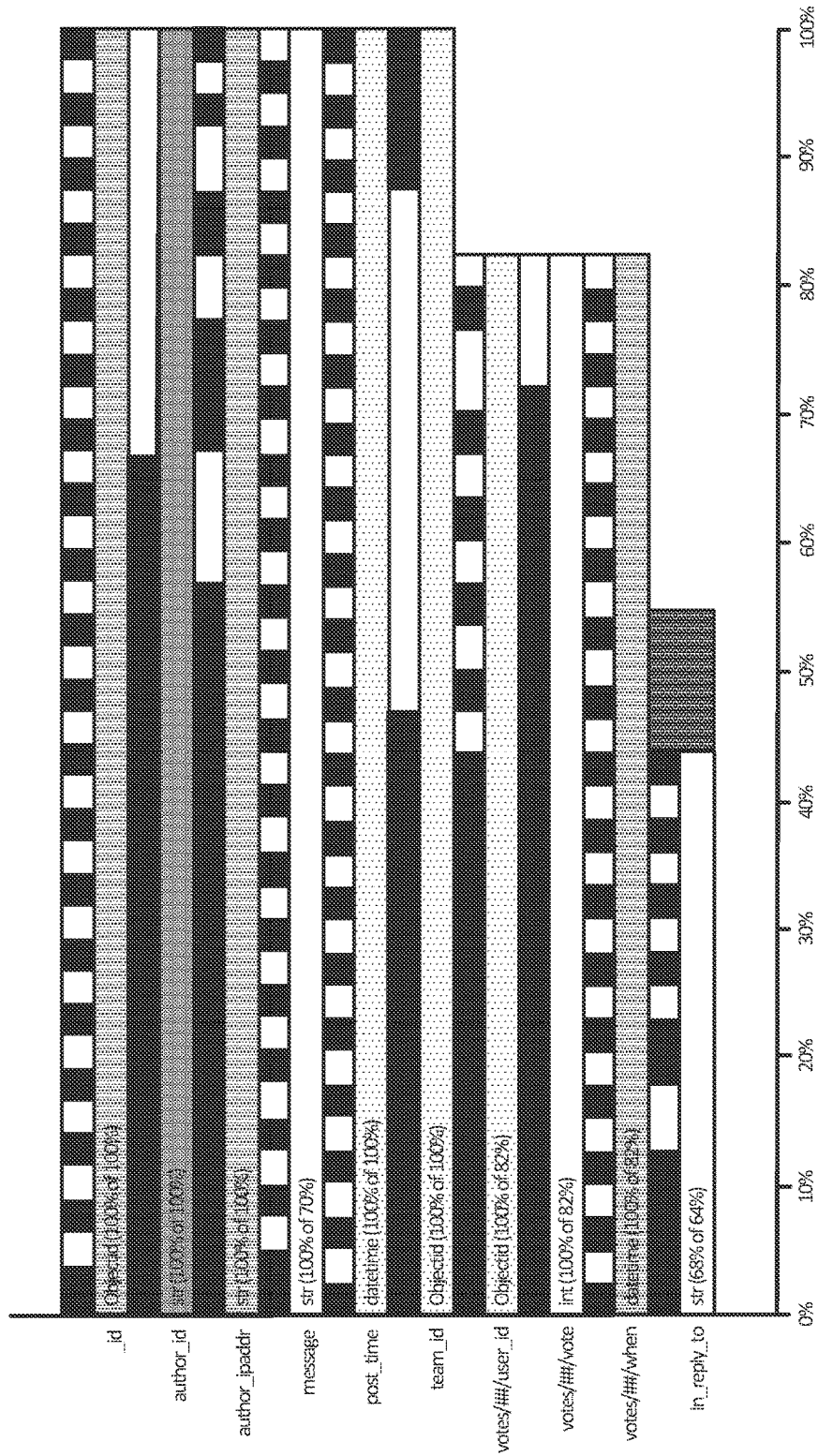
Figure 7F:
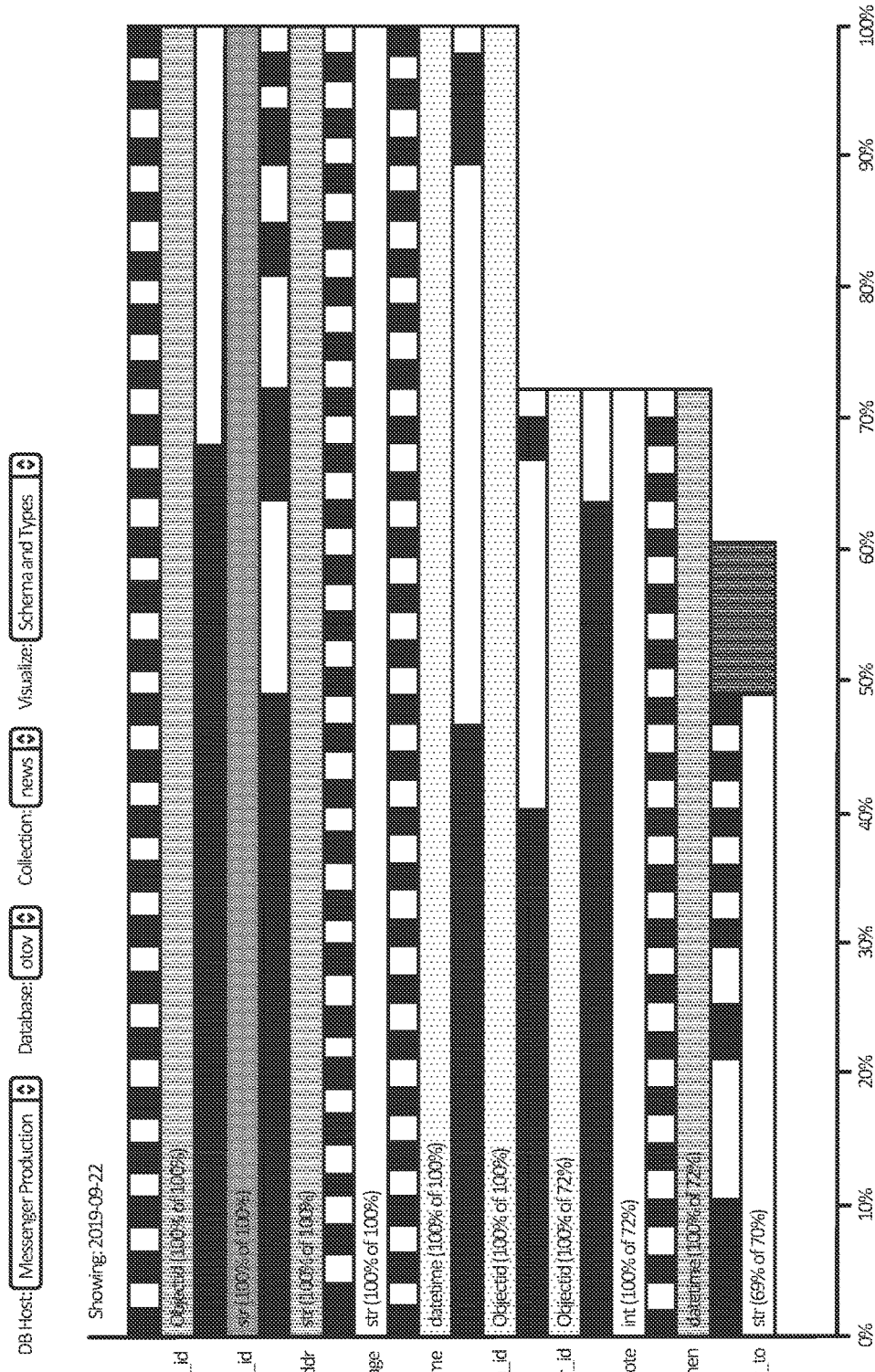

FIG. 6 illustrates system architecture 600 which illustrates one or more embodiments of the present technology. System architecture 600 includes customer environment 610, metadata generator 620, and metadata storage 630. Customer environment 610 includes customer database 613 and data files 615. Data files 615 may be a replica file record. In some embodiments, customer database 613 produces change record stream 642 and data files 615 produces information stream 644. Information stream 644 can include data from data files 615 or a replica of data files 615. Customer environment 610 can transmit change record stream 642 and information stream 644 to metadata generator 620. Change record stream 642 can include any recorded changes to data files 615. In some embodiments, a data processing system such as an ETL data pipeline (not shown), may write information to data files 615 causing one or more changes to occur in data files 615. Customer database 613 can record the changes to data files 615 and may then include the changes to data files 615 in change record stream 642. Information stream 644 can include data stored in data files 615 or data received from a data processing system (not shown).

Metadata generator 620 represents one or more computing systems and can ingest change record stream 642 and information stream 644. In some embodiments, metadata generator 620 includes record hashing module 623, schema building module 625, type checking module 627, and value distribution module 629. Metadata generator 620 can relay the ingested change record stream 642 to record hashing module 623. Record hashing module 623 can record the list of changes included in change record stream 642. In some embodiments, record hashing module 623 may assign a score to each change in change record stream 642. The scores can reflect a severity in each change and can indicate whether or not the change adversely affected a state of data files 615. For example, a change that altered the distribution of data types in data files 615 may be given a more severe score than a change that did not alter the distribution of data types. Record hashing module 623 can produce metadata describing the recorded changes and the scores assigned to each of the changes. The metadata produced by record hashing module 623 may include information relating the types of changes included in change record stream 642. For example, the metadata produced by record hashing module 623 may categorize the changes as additions and/or deletions. The metadata produced by record hashing module 623 can further include counters detailing the number of times each change occurred.

In further embodiments, metadata generator 620 may relay information stream 644 to schema building module 625, type checking module 627, and value distribution module 629. Schema building module 625 can produce metadata detailing the structure of data included in information stream 644. For example, schema building module 625 can determine the schema, the hierarchy, and the counts of data types of information stream 644 and include this information in the produced metadata. Type checking module 627 can produce metadata describing the types and proportions of the types of data in information stream 644. For example, type checking module 627 may track the proportion strings, numbers, and objects in the data of information stream 644 and include the tracked proportions in the produced metadata. Value distribution module 629 can perform distribution analysis on information stream 644 and produce metadata relating the distribution analysis. In some embodiments, the distribution analysis includes analyzing the actual values in the data of information stream 644. In some examples, analyzing the actual values may include determining the distribution between words and strings.

Metadata generator 620 may send the metadata produced by record hashing module 623, schema building module 625, type checking module 627, and value distribution module 629 to metadata storage 630. Metadata storage 630 is representative of one or more storage devices and can store the metadata received from metadata generator 620 as metadata records 633. Metadata storage 630 may operate under continuously or may store metadata in batches. Metadata records 633 can include recently generated metadata as well as metadata generated during previous iterations. Metadata records 633 can be used in metadata training and is not limited by size. In some embodiments, metadata generator 620 utilizes metadata records 633 to produce one or more visual elements to visually depict metadata records 633. Metadata generator 620 can store the one or more visual elements as visuals 635 on metadata storage 630.

FIGS. 7A-7F depict examples data visualizations according to one or more embodiments of the present technology. In some embodiments, the data visualizations include indicators describing the contents of a database. The data visualizations may present any data type or data structure within a database. For example, a data visualization may depict the schema and the data types of a database. The visualizations may include color or pattern schemes detailing the state of any contents in a database. For example, a data object, or a portion of a data object may be marked with a pattern that indicates the data object is defective. In contrast, a data object, or a portion or a data object, may be marked with a pattern or color that indicates that the data object is in a non-defective state.

The visualizations may be interactive and can be updated in real time to reflect changes in a database. Each visualization may show the proportion of data types within a database. For example, the visualizations may indicate that 50% of the contents in a database are strings. The visualizations may include alphanumeric symbols to identify contents within a database. It should be appreciated that the data visualizations are not limited by the data type nor number of data items. In some embodiments, the data visualizations may be generated by utilizing metadata produced by a metadata generator. The metadata can be used to summarize the contents of a particular database and this summary may be depicted in the data visualizations. The visualizations may include one or more animated sections that depict changes over time in a database. The visualizations may be time-stamped as to indicate the state of a database at a particular point in time.

Exemplary Computer System Overview

Aspects and implementations of the pension funding system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

FIG. 800 illustrates computing system 800 that is representative of any system or collection of systems in which the various processes, programs, services, and scenarios disclosed herein may be implemented. Examples of computing system 800 include, but are not limited to, server computers, routers, web servers, cloud computing platforms, and data center equipment, as well as any other type of physical or virtual server machine, physical or virtual router, container, and any variation or combination thereof.

Computing system 800 may be implemented as a single apparatus, system, or device or may be implemented in a distributed manner as multiple apparatuses, systems, or devices. Computing system 800 includes, but is not limited to, processing system 825, storage system 805, software 810, communication interface system 820, and user interface system 830 (optional). Processing system 825 is operatively coupled with storage system 805, communication interface system 820, and user interface system 830.

Processing system 825 loads and executes software 810 from storage system 805. Software 810 includes and implements data monitoring process 815, which is representative of the data monitoring processes discussed with respect to the preceding Figures. When executed by processing system 825, software 810 directs processing system 825 to operate as described herein for at least the various processes, operational scenarios, and sequences discussed in the foregoing implementations. Computing system 800 may optionally include additional devices, features, or functionality not discussed here for purposes of brevity.

Figure 8:
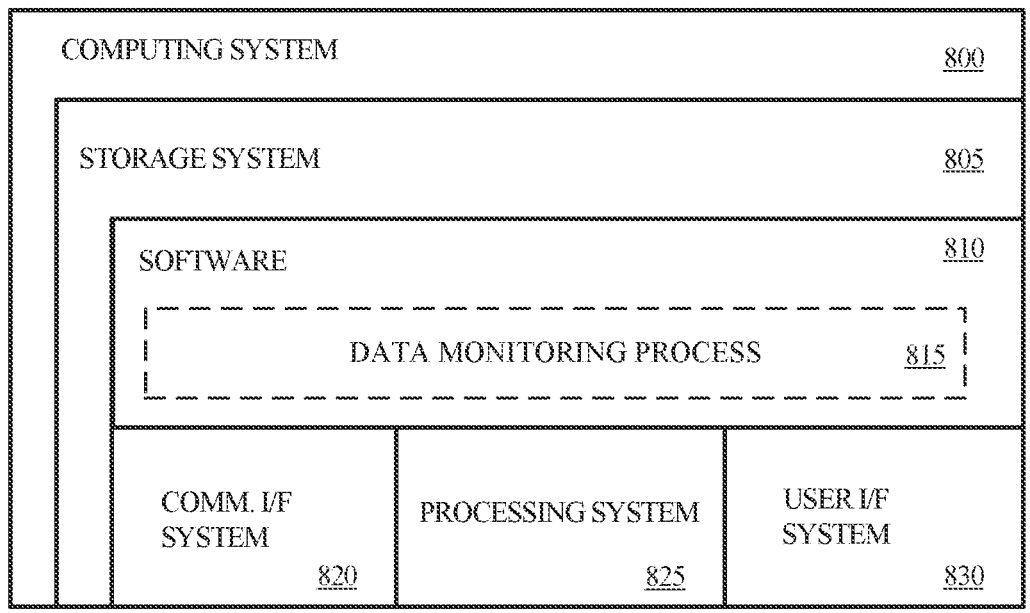
FIG. 8 illustrates an exemplary computing system according to various embodiments of the present technology.

Referring still to FIG. 8, processing system 825 may comprise a micro-processor and other circuitry that retrieves and executes software 810 from storage system 805. Processing system 825 may be implemented within a single processing device but may also be distributed across multiple processing devices or sub-systems that cooperate in executing program instructions. Examples of processing system 825 include general purpose central processing units, graphical processing units, application specific processors, and logic devices, as well as any other type of processing device, combinations, or variations thereof.

Storage system 805 may comprise any computer readable storage media that is readable by processing system 825 and capable of storing software 810. Storage system 805 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 805 may also include computer readable communication media over which at least some of software 810 may be communicated internally or externally. Storage system 805 may be implemented as a single storage device but may also be implemented across multiple storage devices or sub-systems co-located or distributed relative to each other. Storage system 805 may comprise additional elements, such as a controller, capable of communicating with processing system 825 or possibly other systems.

Software 810 (data monitoring process 815) may be implemented in program instructions and among other functions may, when executed by processing system 825, direct processing system 825 to operate as described with respect to the various operational scenarios, sequences, and processes illustrated herein. For example, software 810 may include program instructions for implementing a data monitoring process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 810 may include additional processes, programs, or components, such as operating system software, virtualization software, or other application software. Software 810 may also comprise firmware or some other form of machine-readable processing instructions executable by processing system 825.

In general, software 810 may, when loaded into processing system 825 and executed, transform a suitable apparatus, system, or device (of which computing system 800 is representative) overall from a general-purpose computing system into a special-purpose computing system customized to optimize secure traffic as described herein. Indeed, encoding software 810 on storage system 805 may transform the physical structure of storage system 805. The specific transformation of the physical structure may depend on various factors in different implementations of this description. Examples of such factors may include, but are not limited to, the technology used to implement the storage media of storage system 805 and whether the computer-storage media are characterized as primary or secondary storage, as well as other factors.

For example, if the computer readable storage media are implemented as semiconductor-based memory, software 810 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 820 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 800 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method to facilitate data monitoring in a data pipeline computing system, the method comprising:
    receiving a call from a data pipeline to ingest unprocessed data from an input data stream and ingesting the unprocessed data from the input data stream;
    generating metadata based on the unprocessed data and computing expected data outputs of the data pipeline based on the metadata;
    reading file records comprising historical data outputs generated by the data pipeline and generating historical metadata based on the historical data outputs;
    receiving a call from the data pipeline to ingest processed data that comprises actual data outputs generated by the data pipeline from an output data stream and ingesting the processed data from the output data stream;
    generating output metadata based on the processed data;
    comparing the metadata for the expected data outputs with the output metadata for the actual data outputs and responsively determining when one of more of the expected data outputs do not align with one or more of the actual data outputs;
    comparing the historical metadata for the historical data outputs with the output metadata for the actual data outputs and responsively determining when one of more of the historical data outputs do not align with the one or more of the actual data outputs; and
    generating and transferring an alert signifying the non-alignment when the one of more of the expected data outputs do not align with the one or more of the actual data outputs and/or the one or more of the historical data outputs do not align with the one or more of the actual data outputs.

2. The method of claim 1 wherein generating and transferring the alert further comprises generating a visual error report that comprises at least one or a chart, a graph, a table, a gif, or an animation and that indicates the one of more of the expected data outputs that do not align with the one or more of the actual data outputs.

3. The method of claim 1 wherein:
    generating the metadata based on the unprocessed data comprises determining a value distribution of the unprocessed data, checking data types of the unprocessed data, and identifying a schema for the unprocessed data;
    computing the expected data outputs based on the metadata comprises computing the expected data outputs based on the metadata, the value distribution, the data types, and the data schema of the unprocessed data;
    generating the output metadata comprises determining an output value distribution, checking output data types, and identifying an output data schema for the actual data outputs of the processed data; and
    comparing the metadata with the output metadata comprises comparing the value distribution, the data types, and the data schema for the expected data outputs with the output value distribution, the output data types, and the output data schema for the actual data outputs and responsively determining when the one of more of the expected data outputs do not align with one or more of the actual data outputs.

4. The method of claim 1 further comprising:
    tracking changes in the file records;
    assigning a score to the changes in the file records wherein the score indicates a severity of the changes in the file records;

determining when the score exceeds a score threshold; and transferring a notification when the score exceeds the score threshold.

5. The method of claim 1 wherein generating the historical metadata comprises:

determining a value distribution for the historical data outputs;

checking data types for the historical data outputs; and identifying a data schema for the historical data outputs.

6. The method of claim 5 wherein:

determining a value distribution in the historical data outputs comprises analyzing one or more actual values of the historical data outputs;

checking the data types for the historical data outputs comprises determining a proportion of strings, numbers, and objects in the historical data outputs; and identifying the data schema comprises identifying a hierarchy for the historical data outputs.

7. The method of claim 5 wherein comparing the historical metadata for the historical data outputs with the output metadata for the actual data outputs comprises comparing the value distribution, the data types, and the data schema for the historical data outputs with the output metadata for the actual data outputs and responsively determining when one of more of the historical data outputs do not align with the one or more of the actual data outputs.

8. A system to facilitate data monitoring in a data pipeline computing system, the system comprising:

a data ingestion engine configured to receive a call from a data pipeline to ingest unprocessed data from an input data stream and ingest the unprocessed data from the input data stream;

a metadata generation platform configured to generate metadata based on the unprocessed data and compute expected data outputs of the data pipeline based on the metadata;

the metadata generation platform configured to read file records comprising historical data outputs generated by the data pipeline and generate historical metadata based on the historical data outputs;

the data ingestion engine configured to receive a call from the data pipeline to ingest processed data that comprises actual data outputs generated by the data pipeline from an output data stream and ingest the processed data from the output data stream;

the metadata generation platform configured to generate output metadata based on the processed data;

a data processing engine configured to compare the metadata for the expected data outputs with the output metadata for the actual data outputs and responsively determine when one of more of the expected data outputs do not align with one or more of the actual data outputs;

the data processing engine configured to compare the historical metadata for the historical data outputs with the output metadata for the actual data outputs and responsively determine when one of more of the historical data outputs do not align with the one or more of the actual data outputs;

a data visualization engine configured to generate and transfer an alert signifying the non-alignment when the one of more of the expected data outputs do not align with the one or more of the actual data outputs and/or the one of more of the historical data outputs do not align with the one or more of the actual data outputs.

9. The system of claim 8 wherein the data visualization engine is configured to generate and transfer an alert further comprises the data visualization engine is configured to generate a visual error report that comprises at least one or a chart, a graph, a table, a gif, or an animation and that indicates the one of more of the expected data outputs that do not align with the one or more of the actual data outputs.

10. The system of claim 8 wherein:

the metadata generation platform is configured to generate the metadata based on the unprocessed data comprises the metadata generation platform configured to determine a value distribution of the unprocessed data, check data types of the unprocessed data, and identify a schema for the unprocessed data;

the metadata generation platform is configured to compute the expected data outputs based on the metadata comprises the metadata generation platform configured to compute the expected data outputs based on the metadata, the value distribution, the data types, and the data schema of the unprocessed data;

the metadata generation platform is configured to generate the output metadata comprises the metadata generation platform configured to determine an output value distribution, check output data types, and identify an output data schema for the actual data outputs of the processed data; and the data processing engine configured to compare the metadata with the output metadata comprises the data processing engine configured to compare the value distribution, the data types, and the data schema for the expected data outputs with the output value distribution, the output data types, and the output data schema for the actual data outputs and responsively determine when the one of more of the expected data outputs do not align with one or more of the actual data outputs.

11. The system of claim 8 further comprising:

a record hashing module configured to track changes in the file records;

the record hashing module configured to assign a score to the changes in the file records wherein the score indicates a severity of the changes in the file records;

the record hashing module configured to determine when the score exceeds a score threshold; and the record hashing module configured to transfer a notification when the score exceeds the score threshold.

12. The system of claim 8 wherein the metadata generation platform is configured to generate the historical metadata comprises:

the metadata generation platform configured to determine a value distribution for the historical data outputs;

the metadata generation platform configured to check data types for the historical data outputs; and the metadata generation platform configured to identify a data schema for the historical data outputs.

13. The system of claim 12 wherein:

the metadata generation platform is configured to determine a value distribution in the the historical data outputs comprises the metadata generation platform configured to analyze one or more actual values of the historical data outputs;

the metadata generation platform is configured to check the data types for the historical data outputs comprises the metadata generation platform configured to determine a proportion of strings, numbers, and objects in the historical data outputs; and the metadata generation platform is configured to identify the data schema comprises the metadata generation platform configured to identify a hierarchy for the historical data outputs.

14. The system of claim 12 wherein the data processing engine is configured to compare the historical metadata for the historical data outputs with the output metadata for the actual data outputs comprises the data processing engine configured to compare the value distribution, the data types, and the data schema for the historical data outputs with the output metadata for the actual data outputs and responsively determine when the one of more of the historical data outputs do not align with the one or more of the actual data outputs.

15. A non-transitory computer-readable medium storing instructions to facilitate data monitoring in a data pipeline computing system, wherein the instructions, in response to execution by one or more processors, cause the one or more processors to drive a system to perform operations comprising:
receiving a call from a data pipeline to ingest unprocessed data from an input data stream and ingesting the unprocessed data from the input data stream;
generating metadata based on the unprocessed data and computing expected data outputs of the data pipeline based on the metadata;
reading file records comprising historical data outputs generated by the data pipeline and generating historical metadata based on the historical data outputs;
receiving a call from the data pipeline to ingest processed data that comprises actual data outputs generated by the data pipeline from an output data stream and ingesting the processed data from the output data stream;
generating output metadata based on the processed data;
comparing the metadata for the expected data outputs with the output metadata for the actual data outputs and responsively determining when one of more of the expected data outputs do not align with one or more of the actual data outputs;
comparing the historical metadata for the historical data outputs with the output metadata for the actual data outputs and responsively determining when one of more of the historical data outputs do not align with the one or more of the actual data outputs; and
generating and transferring an alert signifying the non-alignment when the one of more of the expected data outputs do not align with the one or more of the actual data outputs and/or the one of more of the historical data outputs do not align with the one or more of the actual data outputs.

16. The non-transitory computer-readable medium of claim 15, the operations further comprising:
generating a visual error report that comprises at least one or a chart, a graph, a table, a gif, or an animation and that indicates the one of more of the expected data outputs that do not align with the one or more of the actual data outputs.

17. The non-transitory computer-readable medium of claim 15, the operations further comprising:
determining a value distribution of the unprocessed data, checking data types of the unprocessed data, and identifying a schema for the unprocessed data;
computing the expected data outputs based on the metadata, the value distribution, the data types, and the data schema of the unprocessed data;
determining an output value distribution, checking output data types, and identifying an output data schema for the actual data outputs of the processed data; and
comparing the value distribution, the data types, and the data schema for the expected data outputs with the output value distribution, the output data types, and the output data schema for the actual data outputs and responsively determining when the one of more of the expected data outputs do not align with one or more of the actual data outputs.

18. The non-transitory computer-readable medium of claim 15, the operations further comprising:
tracking changes in the file records;
assigning a score to the changes in the file records wherein the score indicates a severity of the changes in the file records;
determining when the score exceeds a score threshold; and
transferring a notification when the score exceeds the score threshold.

19. The non-transitory computer-readable medium of claim 15, the operations further comprising:
determining a value distribution for the historical data outputs;
checking data types for the historical data outputs; and
identifying a data schema for the historical data outputs.

20. The non-transitory computer-readable medium of claim 19, the operations further comprising:
comparing the value distribution, the data types, and the data schema for the historical data outputs with the output metadata for the actual data outputs and responsively determining when one of more of the historical data outputs do not align with the one or more of the actual data outputs.

* * * * *